United States Patent Office 3,268,623
Patented August 23, 1966

3,268,623
RIGID POLYVINYL CHLORIDE COMPOSITIONS HAVING IMPROVED PHYSICAL PROPERTIES
Ludwig A. Beer, Agawam, Mass., assignor to Monsanto Company, a corporation of Delaware
No Drawing. Filed June 21, 1962, Ser. No. 204,031
7 Claims. (Cl. 260—876)

This invention relates to unplasticized vinyl chloride polymers. More particularly, the invention relates to rigid vinyl chloride polymer compositions having improved physical properties.

Unplasticized vinyl chloride polymers have found utility in the manufacture of rigid articles having good resistance to chemical degradation and heat distortion. However, these rigid articles are deficient in certain physical properties such as impact strength. In general, the problem of manufacturing rigid articles having good impact strength has been resolved to a great extent by the elastication of the vinyl chloride polymer with macromolecular products such as chloroprene, butadiene-acrylonitrile, butadiene-styrene, chlorinated and sulfochlorinated polyolefins. Of special note is U.S. Patent No. 3,006,889, which discloses blends of vinyl chloride polymers in physical admixture with chlorination products of polyolefins. However, these attempts to overcome this deficiency in impact strength have generally succeeded only at the expense of sacrificing one or more of the desirable properties of rigidity, clarity, tensile strength, solvent resistance, high heat distortion point and chemical resistance. It is also known to mechanically mix polyvinyl chloride and polyethylene. However, the resulting mixture is incompatible tending to produce blends lacking in homogeneity. Graft copolymers of polyethylene and polyvinyl chloride have been prepared by dissolving the polyethylene in various solvents before reaction. However, the use of solvents is generally undesirable as they tend to reduce grafting efficiency and impair physical properties. Attempts to avoid the use of solvents by higher temperatures have been partially successful but these attempts have also tended to promote decomposition of the vinyl chloride during polymerization.

In accordance with the present invention it has now been found that a graft copolymer of polyvinyl chloride and chlorinated polyolefins, having superior properties over mechanical blends of the same components, can be prepared at low reaction temperatures and without the use of solvents.

Accordingly, it is an object of this invention to provide vinyl chloride polymer compositions having improved physical properties.

Another object of this invention is to provide vinyl chloride polymer compositions having improved solvent resistance, tensile strength and improved clarity.

Another object of this invention is to provide rigid and semi-rigid vinyl chloride polymer compositions having improved physical properties over mechanical blends of vinyl chloride polymers and chlorinated polyolefins.

A further object of this invention is to provide a graft copolymer of polyvinyl chloride and chlorinated and/or chlorosulfonated polyolefins having superior properties over mechanical blends of the same components, which graft copolymer can be prepared at low reaction temperatures and without the use of solvents.

Other objects of this invention will in part be obvious and will in part appear hereinafter.

These and other objects are attained by dissolving chlorinated and chlorosulfonated products of polyolefins in a vinyl chloride monomer composition and polymerizing said monomer composition.

The following examples are given to illustrate the invention and are not intended as limitations thereof. Unless otherwise specified, quantities are mentioned on a weight basis.

*Example I*

A solution of 10 parts chlorinated polyethylene (chlorine content=31.8%, specific viscosity in 0.42% cyclohexanone solution=0.343) in 100 parts vinyl chloride monomer is charged to an air-evacuated pressure vessel containing 160 parts water, 0.30 part methyl cellulose (5.5–7.0 hydroxypropyl, 22–23% methoxy content, viscosity of 2% aqueous solution at 20° C.=100 cps.) and 0.26% lauroyl peroxide.

Polymerization is carried out under agitation at 50° C. for 16 hours. After venting of small quantities of unconverted monomer, 108 parts of a homogeneous, granular resin are obtained. The dry resin passes 100% through a 40 mesh screen and has a specific viscosity of 0.583 (0.400 gram in 100 ml. cyclohexanone at 25° C.).

*Example II*

Polymerization is carried out as in Example I but with solutions of 5, 15 and 20 parts of the same chlorinated polyethylene in 100 parts of vinyl chloride monomer. In all three cases, homogeneous, granular resins of fine particle size are obtained.

*Example III*

Polymerization is carried out as in Example I but with solutions of 30 and 35 parts of the same chlorinated polyethylene in 100 parts of vinyl chloride monomer. In both cases, homogeneous, granular resins of fine particle size are obtained.

*Example IV*

Polymerization is carried out as in Example I except that chlorosulfonated polyethylene (chlorine content= 29%, sulfur content=1.2%) is used in place of the chlorinated polyethylene. A homogeneous, granular resin is obtained.

*Example V*

A solution of 15 parts chlorinated polyethylene (31.8% chlorine) in 10 parts cyclohexane and 100 parts vinyl chloride monomer is dispersed under agitation in an air-evacuated pressure vessel in 160 parts water containing 0.36 part methyl cellulose as suspending agent and 0.26 part lauroyl peroxide as polymerization initiator.

After 16 hours polymerization at 50° C., a homogeneous, granular resin is obtained which, after washing with methanol and drying, has a specific viscosity of 0.453 (0.400 gram in 100 ml. cyclohexanone at 25° C.).

*Example VI*

One hundred and forty parts water, 0.25 part polyvinyl alcohol (82% hydrolyzed, viscosity of 4% aqueous solution at 20° C.=100 cps.), 0.10 part sorbitan monolaurate and 10 parts granular, chlorinated polyethylene (31.8% chlorine) are charged to a pressure vessel at 60° C. After purging by evacuation, 100 parts vinyl chloride monomer are added and the suspension is agitated for 2 hours at 60° C. after which 0.16 part lauroyl peroxide is added.

One hundred and eight parts of a homogeneous, granular resin with a specific viscosity of 0.418 (0.400 gram in 100 ml. cyclohexanone at 25° C.) are obtained after 8 hours polymerization.

*Example VII*

A mechanical blend is prepared by physically mixing 90 parts of polyvinyl chloride suspension resin (specific viscosity=0.540) and 10 parts of the same type of chlorinated polyethylene used in the previous examples. To this blend and to each 100 parts of resins obtained in Examples I, II, V and VI are added 2 parts tin stabilizer, 1 part calcium stearate and 2 parts of a fatty amide synthetic wax (Advawax 280). The blend designation, the example setting forth the procedure used to prepare the particular blend, and the weight percent of the chlorinated polyethylene for each blend is as follows:

| Blend No. | Example | Wt. Percent Chlorinated Polyethylene |
|---|---|---|
| Physical Blend | VII | 10.0 |
| 1 | I | 9.2 |
| 2 | II | 4.8 |
| 3 | II | 13.3 |
| 4 | II | 17.0 |
| 5 | V | 13.5 |
| 6 | VI | 9.4 |

Each of the above blends is compounded by milling on a 2 roll mill at 175° C. for 15 minutes. Test specimens are molded from the resulting stock in a press at 185° C. and 4000 p.s.i. for 5 minutes to form smooth-surfaced, flat slabs having the properties shown in Table I.

TABLE I

|   | Physical Blend | 1 | 2 | 3 | 4 | 5 | 6 |
|---|---|---|---|---|---|---|---|
| Tensile Strength, p.s.i.: |  |  |  |  |  |  |  |
| At Yield | 5,440 | 6,420 | 7,060 | 4,790 | 3,770 | 5,710 | 6,470 |
| At Failure | 4,930 | 6,000 | 7,110 | 4,460 | 3,590 | 6,130 | 5,630 |
| Percent Elongation: |  |  |  |  |  |  |  |
| At Yield | 3.5 | 3.7 | 3.4 | 3.9 | 6.5 | 4.1 | 4.0 |
| At Failure | 102 | 107 | 138 | 82 | 38 | 166 | 104 |
| Tensile Modulus, p.s.i.×$10^5$ | 2.8 | 3.4 | 3.9 | 2.7 | 2.3 | 2.9 | 3.4 |
| Rockwell "R" Hardness | 97 | 105 | 110 | 87 | 71 | 98 | 105 |
| Izod Impact Strength, ft.-lbs./in. | 20 | 12 | 2 | 21 | 19 | 15 | 12 |

As shown in the above table, the graft copolymer compositions containing comparable starting proportions of chlorinated polyethylene (see Compositions 1 and 6) are superior in tensile strength, modulus and hardness to a mechanical blend.

*Example VIII*

A solution of 10 parts chlorinated polyethylene (24.0% chlorine, specific viscosity=0.288 in cyclohexanone) in 95 parts vinyl chloride monomer is charged to an air-evacuated pressure reactor containing 120 parts water, 0.20 part methyl cellulose, 0.10 part sorbitan monolaurate and 0.16 part lauroyl peroxide. After 8 hours polymerization under agitation at 57° C. and after venting unconverted monomer, 100 parts of a granular resin with a specific viscosity of 0.430 are obtained.

*Example IX*

Samples are taken from (a) the resin prepared as in Example VIII (designated as VIII), (b) the resin blends designated in Example VII as Blend Numbers 1, 3, 5 and 6 and (c) two milled, mechanical blends, designated Blend A and Blend B, each containing 100 parts polyvinyl chloride and 15 parts chlorinated polyethylene; said chlorinated polyethylene having a chlorine content for Blend A of 31.8% and a chlorine content for Blend B of 24.0%. Each sample is extracted in a soxhlet extractor with hot cyclohexane for 48 hours. Typical extraction values are contained in Table II.

TABLE II

|   | Mechanical Blends | | Graft Copolymer Compositions | | | | |
|---|---|---|---|---|---|---|---|
|   | A | B | VIII | 1 | 3 | 5 | 6 |
| Percent Chlorinated Polyethylene in Blend Extractable | 100 | 99.6 | 15.4 | 39.2 | 42 | 64.6 | 35.1 |

As shown in Table II, all of the chlorinated polyethylene contained in physical blends is extractable with cyclohexane while only fractions, generally less than 50% of the originally added rubber, are extractable at these conditions from the graft copolymer. It is significant that the only graft copolymer resulting in an extraction higher than 50% is that prepared by originally adding a solvent in addition to the chlorinated polyethylene to vinyl chloride monomer. The data indicates that grafting efficiency is increased at higher polymerization temperatures and reduced in the presence of an inert diluent.

*Example X*

Three graft copolymer compositions, as prepared according to Example VIII and three mechanical blends of 90 parts polyvinyl chloride resin (specific viscosity= 0.380) and 10 parts chlorinated polyethylene (24.0% chlorine) are processed on a 2 roll mill at 165° C. after addition of 2 parts of a tin stabilizer.

The mill roll clearance is set to permit sample strips of approximately 0.025" thickness to be taken after 15 minutes milling. Sample strips of each blend are laminated between glass plates and tested for light transmittance at 680 m$\mu$. Table III shows typical haze readings obtained from the mechanical and graft copolymer compositions.

TABLE III

Percent haze at 680 m$\mu$, percent

Mechanical blends _____ 95.5
Graft copolymer compositions _____ 17.0–58.0

As shown in the above Table III, haze readings measured on the mechanical blends are considerably higher than those measured on the graft copolymer compositions prepared using equivalent proportions of vinyl chloride and chlorinated polyethylene. Consequently, the transparency of the graft copolymer compositions is significantly superior to that of mechanical blends.

*Example XI*

A graft copolymer composition of Example VIII and a mechanical blend of 90 parts polyvinyl chloride suspension resin and 10 parts chlorinated polyethylene (24.0% chlorine) are milled on a 2 roll mill at 165° C. using the following formulation:

|   | Parts |
|---|---|
| Resin (graft or mechanical) | 100 |
| Polymeric processing aid (methyl methacrylate) | 1 |
| Tin mercaptide | 2 |
| Polymeric epoxy plasticizer (epoxidized fatty acid ester) | 2 |
| Stearic acid | 1 |
| UV-stabilizer (2 - hydroxyl - 4 - methoxy benzophenone) | 1 |

Sample strips of 0.025" thickness are taken after 15 minutes milling time and subjected to ultraviolet radiation for varying periods of time.

Table IV shows typical effects of UV-irradiation for both the mechanical and graft copolymer compositions.

Ultraviolet resistance is important for applications involving exposure to sunlight (outdoor uses).

TABLE IV

|  | Percent Transmittance at 430 mµ After UV Exposure for Days | | | |
|---|---|---|---|---|
|  | 0 | 7 | 13 | 21 |
| Graft Blend | 57.8 | 25.1 | 8.5 | 4.5 |
| Mechanical Blend | 43.4 | 19.9 | 7.4 | 2.6 |

*Example XIII*

A mechanical blend of 90 parts polyvinyl chloride suspension resin (specific viscosity=0.380) and 10 parts chlorinated polyethylene (24.0% chlorine) and a graft copolymer composition as prepared in Example VIII are made up with the following ingredients:

| | Parts |
|---|---|
| Resin | 100 |
| Polymer processing aid (methyl methacrylate) | 4 |
| Tin mercaptide | 2 |
| Polymeric epoxy plasticizer (epoxidized fatty acid ester) | 2 |
| Lubricant (calcium stearate) | 2 |

Each blend is milled at 165° C. for 5, 10 and 15 minutes. Table V shows typical impact strength values of the mill strips.

TABLE V

| Milling Time | Izod Impact Strength, ft.-lbs./in. | |
|---|---|---|
|  | Mechanical Blend | Graft Copolymer Composition |
| 5 Minutes | 1.58 | 16.4 |
| 10 Minutes | 1.83 | 18.4 |
| 15 Minutes | 2.14 | 17.9 |

Mechanical blends depend upon the chlorine content of the chlorinated polyolefin to achieve the level of compatibility necessary for reinforcement. Thus, mechanical blends tend to decrease in effectiveness as the chlorine content of the polyolefin falls below about 30%. At about 23% an incompatible, friable mixture is obtained. Table V above sets forth typical values of impact strengths of both the graft composition and the mechanical blend wherein the chlorinated polyethylene component represents 10% of the total material and contains 24% chlorine. In general, a certain quantity of chlorine is necessary to impart rubbery characteristics to the polyethylene. However, as the chlorine content is increased, the chlorinated polyethylene increases in rigidity. The graft copolymer compositions permit the use of chlorinated polyethylene of low chlorine content which in turn improves the physical properties at low temperatures. As can be further seen from Table V, it is apparent that the graft copolymer at the lower chlorine content is clearly superior to the mechanical blend at any degree of processing.

*Example XIII*

A mechanical blend and a graft copolymer composition are prepared using the same procedure and ingredients as set forth in Example XII. To both the blend and the composition, sufficient polyvinyl chloride suspension resin (specific viscosity=0.380) is physically admixed to reduce the proportion of chlorinated polyethylene first to 7½% of the resin composition and secondly to 4% of the resin composition. Samples taken at both compositional levels are 165° C. for 5, 10 and 15 minutes.

Table V shows typical impact strength values obtained on samples taken after each interval of milling.

TABLE VI

| Percent Chlorinated Polyethylene | Milling Time | Notched Impact Strength, ft.-lbs./in. | |
|---|---|---|---|
|  |  | Mechanical Blend | Graft Copolymer Composition |
| 7½ | 5 Minutes | 1.5 | 3.5 |
|  | 10 Minutes | 2.1 | 18.1 |
|  | 15 Minutes | 2.1 | 18.2 |
| 4 | 15 Minutes | 1.0-1.5 | 3.0 |

Impact strengths of mechanical blends of polyvinyl chloride and chlorinated polyethylene are generally good if the proportion of chlorinated polyethylene in the composition is greater than 10%. However, as shown in the above Table VI, when the chlorinated polyethylene component of the mechanical blend and the graft copolymer composition containing equivalent proportions of vinyl chloride and chlorinated polyethylene is reduced below 7% by dilution with polyvinyl chloride resin, the impact strengths of the graft copolymer compositions are superior even over sustained periods of milling.

Tables I to VI demonstrate various property distinctions between mechanical and graft copolymer compositions prepared using equivalent starting proportions of vinyl chloride and chlorinated polyethylene. Actually, the compositions of the mechanical blend and the graft copolymer composition are quite different, since, in the case of the graft copolymer composition, a substantial proportion of the vinyl chloride monomer becomes chemically-combined with the chlorinated polyethylene. Available evidence indicates that the following composition values shown in Table VII are typical for graft copolymer compositions and mechanical blends prepared using 10% chlorinated polyethylene and the equivalent of 90% vinyl chloride monomer. (In the case of the mechanical blend, the vinyl chloride is polymerized prior to mixing.)

TABLE VII.—COMPOSITION OF BLENDS

|  | Mechanical Blend | Graft Copolymer Composition |
|---|---|---|
| Chlorinated Polyethylene, percent | 10 | 0-3 |
| Polyvinyl Chloride, percent | 90 | 80-85 |
| Graft (Chlorinated Polyethylene-Polyvinyl Chloride), percent |  | 12-20 |

Graft copolymer compositions of chlorinated polyethylene and vinyl chloride have unique advantages over other graft polymers based on polyvinyl chloride. For example, Table VIII demonstrates the superior chemical resistance of the chlorinated polyethylene/vinyl chloride graft copolymer composition over ethylene-vinyl acetate/vinyl chloride graft copolymer composition. The chemical resistance is measured by the change in weight of the copolymer composition on prolonged exposure of 7 days to various corrosive chemicals, controlled at temperatures of 60° C. A large change in the weight of the graft copolymer compositions would indicate poor chemical resistance.

TABLE VIII

|  | Percent Weight Gain | |
|---|---|---|
|  | Chlorinated Polyethylene Graft | Ethylene Vinyl Acetate Graft |
| Conc. $H_2SO_4$ Acid | 0.8 | 38.6 |
| Conc. $HNO_3$ Acid | 2.1 | 10.0 |
| Glacial Acetic Acid | 11.0 | 20.4 |
| ASTM #3 Oil | 0.04 | 6.2 |

The graft polymer can be conveniently prepared by dissolving the chlorinated olefins in the vinyl chloride monomer and then polymerizing the vinyl chloride. Although suspension polymerization is the preferred procedure with respect to production volume, ease of recovery and physical form of resins, this invention is not restricted thereto. Polymerization may also be carried out by mass, solution, or emulsion techniques.

In the preferred suspension polymerization process, water, suspending agents and chlorinated polyethylene are charged to an agitated pressure vessel. The vessel is sealed and substantially evacuated of air to substantially eliminate oxygen, after which cold vinyl chloride is added and the resulting mixture agitated at temperatures anywhere between 20–70° C., to dissolve the chlorinated polyethylene in the vinyl chloride monomer. After the chlorinated polyethylene has substantially dissolved, lauroyl peroxide is added and the polymerization allowed to proceed at temperatures of 25–80° C., and more preferably, 45–65° C., until the pressure drops below 60 p.s.i.g. The remaining monomer is vented off and the resin recovered by centrifuging and drying. The estimated percent yield will generally be in the order of 94%. The same procedure may be used for the polymerization of vinyl chloride monomer having chlorosulfonated polyethylene dissolved therein to form good quality graft copolymer compositions of polyvinyl chloride and chlorosulfonated polyethylene.

The amount of water charged to the process is generally adjusted to give maximum vessel productivity consistent with a low slurry viscosity for maintaining adequate heat transfer and storage. As a result, the amount of water charged will generally vary between 100 to 250 parts by weight per 100 parts of total monomer charged. The lauroyl peroxide is generally varied within narrow ranges to obtain a polymerization cycle of 16 hours or less, including time for solvation of chlorinated polyethylene. Operation in accordance with the above process will provide graft polymerization in which polyvinyl chloride chains are chemically bound to the rubber backbone. It is important that the chlorinated olefin rubber be dissolved in the vinyl chloride monomer before polymerization is started. Generally about a 75-minute dissolving period is sufficient at 60° C. If rubbery lumps are evident in the final product, the dissolving period should be increased.

When vinyl chloride is polymerized in the presence of a dissolved chlorinated or chlorosulfonated polyolefin, the resultant product is a mixture of (1) chlorinated and/or chlorosulfonated polyolefin backbone chains with pendant polyvinyl chloride chains, (2) polyvinyl chloride homopolymer, (3) a small amount of unchanged chlorinated and/or chlorosulfonated polyolefin and (4) polymerization aids.

The graft copolymer compositions formed in the practice of the present invention are those wherein 2–40% by weight of a chlorinated polyolefin having a chlorine content of 15–49% by weight is graft polymerized with 60–98% by weight of monomeric material. Similar proportions of a chlorosulfonated polyolefin may be used in place of the chlorinated polyolefin. The chlorine content of the chlorosulfonated polyolefin will generally range between 10–35% with a sulfur content less than 5% for optimum blend properties. The monomeric material used in effecting the graft polymerization comprises at least 80% by weight of vinyl chloride and may include up to 20% of other ethylenically unsaturated monomers copolymerizable therewith. Thus, vinylidene chloride, vinyl esters of organic acids, acrylonitrile, acrylates, methacrylates, maleates, fumarates and other unsaturated organic compounds can be used as comonomers. In addition, polymers made from vinyl chloride and two or more comonomers are also applicable.

The graft copolymer compositions formed in the practice of this invention can be physically blended with other compatible polymer compositions. A preferred composition for the formation of high or medium material that can be extruded or calendered at relatively high rates to give high quality products, is one where 40–100% by weight of the graft copolymer composition formed in the practice of this invention is physically admixed with 0–60% by weight of polyvinyl chloride homopolymer, with possible adjuncts up to 0–10% by weight of other compatible polymers.

The chlorinated or chlorosulfonated polyolefins used in the practice of this invention are those obtained by chlorination or chlorosulfonation of high polymeric hydrocarbons such as polyethylene, polypropylene and their copolymers. They may be prepared by any of the methods conveniently used for the chlorination of polyolefins, e.g., by chlorination or chlorosulfonation of the polymer in solution, in aqueous dispersion or in dry form. Particularly suitable are the chlorination or chlorosulfonation products of low pressure olefins, although good results have been obtained with products prepared by the high pressure polymerization process. For optimum performance, the olefins should be uniformly chlorinated or chlorosulfonated and should have weight average molecular weights of 10,000 to 100,000, and more preferably, 14,000 to 35,000.

As previously indicated, the chlorine content of the chlorinated polyolefins may vary within wide limits, for example, polyolefins with chlorine contents, as low as 15%, can be used to prepare polyvinyl chloride graft copolymer compositions having fair to good impact strengths. On the other hand, chlorine contents above 49% do not serve to further improve physical properties but rather tend to increase the brittleness of the final product. For optimum balance of both tensile and impact properties, the preferred graft copolymer compositions would be those wherein the chlorinated polyolefin has a chlorine content of 23–39% by weight and constitutes 3–25% by weight of the total blend. Chlorinated polyethylene performs exceptionally well within these ranges and is the preferred chlorinated polyolefin. The chlorine and sulfur contents of the chlorosulfonated polyolefins may also vary within wide limits, for example, chlorine contents in the range of 10–35%, preferably 25–32%, and sulfur contents less than 5%, and preferably 1–2%, based on the weight of the chlorosulfonated polyolefin, will produce graft copolymer compositions having good physical properties.

The polymerization may be accelerated by heat, irradiation and polymerization catalysts. Catalysts which have been found to be useful are monomer-soluble organic peroxides, e.g., benzoyl peroxide, lauroyl peroxide, 2,4-dichlorobenzoyl peroxide, acetyl peroxide, acetyl benzoyl peroxide, or other unsymmetrical peroxides, t-butyl hydroperoxide, alkyl percarbonates, perborates, azo compounds, and mixtures of the same. The quantity of catalyst will generally be varied depending on initiator activity, and on the quantity of monomer and diluent. The polymerizations can also be advantageously carried out in the presence of chain regulators such as chlorinated hydrocarbons, alcohols, aldehydes, etc., although grafting efficiency is reduced by their presence. Suitable suspending agents that can be used in the practice of this invention are hydrophilic, macromolecular, natural or synthetic colloids and nonionic or ionic synthetic surfactants, and mixtures of the same.

Optional additives, such as stabilizers, fillers, colorants, processing aids, lubricants, co-plasticizers, etc., can be incorporated into the polyblends if desired.

Among the processing aids and co-plasticizers for incorporation into the polyblends are, e.g., methyl methacrylate polymers, styrene-acrylonitrile copolymers, styrene-methyl methacrylate copolymers, epoxy components, chlorinated paraffins, etc.

The products of this invention are rigid or semirigid graft copolymer compositions which are useful in preparing rigid and semirigid sheets, tubes and molded objects having an optimum balance of high impact and tensile strengths. They are also characterized by good flow properties at relatively low processing temperatures, high heat distortion point and excellent chemical and solvent resistance. These latter properties, as well as its high resistance to ultraviolet radiation, make the products of this invention excellent for many outdoor applications such as corrugated and flat roofing, siding, etc. Examination of samples of the compositions withdrawn from a roll mill after milling times of 5, 10 and 25 minutes shows that they can withstand relatively long milling times without undergoing thermal degradation. They may be calendered, injection molded, extruded, or otherwise fabricated to form rigid sheets, pipes, structural pieces, wire coatings, etc. When desirable, they can be reinforced, e.g., with asbestos fibers.

It is obvious that many variations may be made in the products and processes set forth above without departing from the spirit and scope of this invention.

What is claimed is:

1. A graft copolymer composition prepared by polymerizing 60 to 98% by weight of vinyl chloride monomer with 2 to 40% by weight of a chlorinated polyolefin having a chlorine content of 15–49% by weight dissolved therein.

2. A graft copolymer composition prepared by polymerizing 60 to 90% by weight of vinyl chloride monomer with 2 to 40% by weight of chlorinated polyethylene having a chlorine content of 15 to 49% by weight dissolved therein.

3. A graft copolymer composition as in claim 1 wherein the chlorinated polyolefin has a weight average molecular weight of 10,000 to 100,000.

4. A graft copolymer composition prepared by polymerizing 60–98% by weight of vinyl chloride monomer with 2–40% by weight of a chlorosulfonated polyolefin having a chlorine content of from 10–35% by weight and a sulfur content of up to 5% by weight dissolved therein.

5. A blend comprising an intimate mixture of (A) 40–99% by weight of a graft copolymer composition, prepared by polymerizing 60–98% by weight of vinyl chloride monomer with 2–40% by weight of a chlorinated polyolefin having a chlorine content of 15–49% by weight dissolved therein.

6. A process for preparing a graft copolymer composition at low reaction temperatures and without the use of solvents by first dissolving 2–40% by weight of a chlorinated polyolefin having a chlorine content of 15–49% by weight in 60–98% by weight of vinyl chloride monomer and polymerizing the vinyl chloride monomer onto the chlorinated polyolefin.

7. A process for preparing a graft copolymer composition at low reaction temperatures and without the use of solvents comprising the steps in sequence of (1) heating 100 to 250 parts by weight of water to temperatures between 20–70° C. in the presence of a suspending agent, a surfactant, and 5 to 40 parts by weight of a chlorinated polyolefin having a chlorine content of 15 to 49% by weight, (2) adding, while maintaining a substantial absence of oxygen, 60 to 95 parts by weight of vinyl chloride monomer, at temperatures between 20–70° C., (3) adding, after the chlorinated polyolefin has substantially dissolved in said monomer, 0.01 to 2.0 parts by weight of catalyst and (4) polymerizing the vinyl chloride monomer at temperatures between 25–80° C.

References Cited by the Examiner

UNITED STATES PATENTS

| | | | |
|---|---|---|---|
| 2,834,749 | 5/1958 | Salyer et al. | 260—878 |
| 2,947,719 | 8/1960 | Rugg et al. | 260—878 |
| 2,981,720 | 4/1961 | Herzberg et al. | 260—94.9 |
| 3,168,499 | 4/1965 | Orthner et al. | 260—94.9 |

FOREIGN PATENTS 843,210   8/1960   Great Britain.

SAMUEL H. BLECH, *Primary Examiner.*

JAMES A. SEIDLECK, MURRAY TILLMAN,
*Examiners.*

N. W. SHUST, D. J. BREZNER, *Assistant Examiners.*

UNITED STATES PATENT OFFICE
CERTIFICATE OF CORRECTION

Patent No. 3,268,623                      August 23, 1966

Ludwig A. Beer

It is hereby certified that error appears in the above numbered patent requiring correction and that the said Letters Patent should read as corrected below.

Column 10, line 4, after "therein" insert -- ; and (B) 1-60% by weight of polyvinyl chloride --.

Signed and sealed this 24th day of October 1967.

(SEAL)
Attest:

Edward M. Fletcher, Jr.                      EDWARD J. BRENNER

Attesting Officer                              Commissioner of Patents